(12) United States Patent
Mizell, III

(10) Patent No.: US 7,150,125 B1
(45) Date of Patent: Dec. 19, 2006

(54) INSECT ATTRACTION AND CAPTURE DEVICE

(75) Inventor: Russell F. Mizell, III, Monticello, FL (US)

(73) Assignee: University of Florida, Gainesville, FL (US)

( * ) Notice: Subject to any disclaimer, the term of this patent is extended or adjusted under 35 U.S.C. 154(b) by 883 days.

(21) Appl. No.: 08/654,600

(22) Filed: May 29, 1996

(51) Int. Cl.
*A01M 1/10* (2006.01)

(52) U.S. Cl. .................. 43/122; 107/118; 107/121
(58) Field of Classification Search ............ 43/118, 43/121, 122, 107, 114
See application file for complete search history.

(56) References Cited

U.S. PATENT DOCUMENTS

| | | | | |
|---|---|---|---|---|
| 726,604 | A * | 4/1903 | Williamson | 43/118 |
| 987,889 | A * | 3/1911 | Kress | 43/118 |
| 990,084 | A * | 4/1911 | Vogt | 43/118 |
| 1,027,602 | A * | 5/1912 | Hamilton | 43/118 |
| 1,057,867 | A * | 4/1913 | Meadows | 43/118 |
| 1,091,717 | A * | 3/1914 | Terhume | 43/118 |
| 1,096,889 | A * | 5/1914 | Boyd | 43/118 |
| 1,185,935 | A * | 6/1916 | Pugh | 43/118 |
| 1,229,107 | A * | 6/1917 | McDonough | 43/118 |
| 1,249,753 | A * | 12/1917 | Higgins | 43/118 |
| 1,293,271 | A * | 2/1919 | Weir | 43/118 |
| 1,312,096 | A * | 8/1919 | Boyle | 43/118 |
| 1,313,837 | A * | 8/1919 | Schrantz | 43/118 |
| 1,324,888 | A * | 12/1919 | Formby | 43/118 |
| 1,341,416 | A * | 5/1920 | Curry | 43/118 |
| 1,606,568 | A * | 11/1926 | Gross | 43/118 |
| 1,823,365 | A * | 9/1931 | Kozlowski | 43/118 |
| 1,968,953 | A * | 8/1934 | Metzger | 43/107 |
| 3,581,429 | A * | 6/1971 | Hickman | 43/107 |
| 3,807,081 | A * | 4/1974 | Chaprewsky | 43/118 |
| 3,987,577 | A * | 10/1976 | Hardee | 43/121 |
| 4,611,425 | A | 9/1986 | Dickerson | 43/121 |
| 4,706,410 | A * | 11/1987 | Briese | 43/122 |

OTHER PUBLICATIONS

Proceedings of the Southeastern Pecan Growers Association, "A New Monitoring Method for Detection of the Stinkbug Complex in Pecan Orchards," Mizell et al, pp. 36-41 (Jun. 1, 1995).

(Continued)

*Primary Examiner*—Kurt Rowan
(74) *Attorney, Agent, or Firm*—Miles & Stockbridge PC; Dennis P. Clarke

(57) ABSTRACT

An apparatus particularly adapted for capturing target insect species comprising a bottom portion for attracting the target insects and directing them toward and into a top portion for the capture thereof. The bottom portion comprises a plurality of elements cooperating along longitudinal axes thereof to form at least two essentially planar fins extending radially the longitudinal axes and upwardly from wider bases to narrower apexes, the bases cooperating at the lower end of the apparatus to maintain it positionally stable while resting thereon at or near the ground. The fins further cooperate to form at least one channel narrowing from the wider bases thereof to the narrower apexes thereof at the upper end of the bottom portion, the bottom portion being predominantly of a color which reflects light having a wavelength which attracts the target insects. The top portion of the apparatus comprises an enclosed chamber except for an entrance opening thereinto positioned over and surrounding the upper end of the bottom portion such that no portion of the entrance opening touches the fins and further such that the at least one channel terminates within the chamber.

10 Claims, 5 Drawing Sheets

OTHER PUBLICATIONS

*J. Entomol. Sci.*, vol. 29, No. 1, "A New Technique for Monitoring Pecan Weevil Emergence (*Coleoptera: Curculionidae*)," Tedders et al, pp. 18-30 (1994).

*J. Entomol. Sci.*, vol. 31, "Experiments with Pyramidal Traps for Monitoring Pecan Weevil Presence (*Coleoptera: Curculionidae*)," Tedders et al, [in press].

"Theoretical Scheme Describing the Behavior of *Curculionidae*," Mizell (1994).

The Good Fruit Grower, "Keeping Stink Bugs Out of Orchards Is Tricky," Warner (May 1995).

*Techniques in Pheromone Research*, Chapter 4, "Field Trapping with Attractants: Methods and Interpretation," Cardé et al, pp. 111-129 [Hummel et al, eds., Springer-Verlag, New York (1984)].

*J. Econ. Entomol.*, vol. 67, No. 4, "In-Field Traps: A New Concept in Survey and Supression of Low Populations of Boll Weevils," Mitchell et al, pp. 506-508 (Aug. 1974).

*J. Econ. Entomol.*, vol. 62, No. 1, "Attraction of Female Boll Weevils to Traps Baited with Males or Extracts of Males," Cross et al, pp. 154-161 (Feb. 1969).

\* cited by examiner

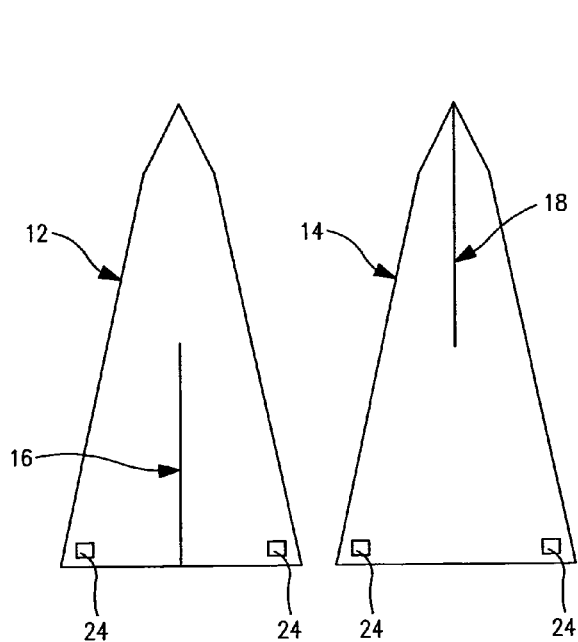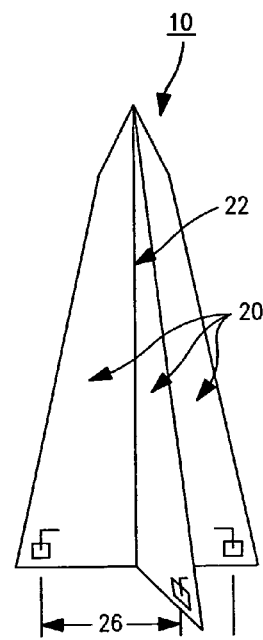
FIG. 1(a)      FIG. 1(b)

INSECT ATTRACTION AND CAPTURE DEVICE

BACKGROUND OF THE INVENTION

1. Field of the Invention

The invention relates to a novel system for attracting and capturing insects.

2. Discussion of the Prior Art

Stinkbugs [Hemiptera: Pentatomidae and Coreidae]are rapidly becoming one of the most dreaded and persistent pests in a wide variety of crop plants. They are worldwide pests of pome (apple and related species) and stone fruits (peach and related species); vegetables (legumes, cucurbits); grains; pine cones (forest seed orchards); and pecans.

Exemplary of particularly noxious stinkbug species are *Euschistus servus* (Say), *E. tristigmus* (Say), *Oebalus pugnax* (F.), *Acrosternum hilare* (Say), *Nezara viridula* (L.), *Acanthocephala femorata* (F.), *Acanthocephala terminalis* (Dallas), *Leptoglossus phyllopus* (L.) and *Leptoglossus oppositus* (Say). These species and other related species occur throughout the United States and the world as pests of commercial agriculture, forestry and home gardens. There are no practical methods available to monitor or trap these important pest species in that it now requires harsh chemicals to achieve "knock down" of the typical stinkbug species. Since stinkbugs invade crops in the growing season, a grower's choice of chemicals is restricted by pre-harvest intervals. Moreover, it is difficult to predict when the pests will invade crop species and repeated sprays are required as new bugs continually migrate to the fields.

Various traps have been proposed for capturing pest insect species [Tedders, *J. Entomol. Sci.*, Vol. 29, pp. 18–30 (1994); and U.S. Pat. No. 4,611,425]; however, none have proven effective for attracting and capturing stinkbugs in any meaningful numbers.

It is an object of the present invention to provide a novel system for attracting and capturing pest insects, particularly stinkbug species, which does not require harsh chemicals and is non-injurious to crop species and the environment.

SUMMARY OF THE INVENTION

These and other objects are realized by the present invention, one embodiment of which relates to an apparatus particularly adapted for capturing target insect species comprising a bottom portion for attracting the target insects and directing them toward and into a top portion for the capture thereof; the bottom portion comprising a plurality of elements cooperating along longitudinal axes thereof to form at least two essentially planar fins extending radially from the longitudinal axes and upwardly from wider bases to narrower apexes, the bases cooperating at the lower end of the apparatus to maintain it positionally stable while resting thereon at or near the ground, the fins further cooperating to form at least one channel narrowing from the wider bases thereof to the narrower apexes thereof at the upper end of the bottom portion, the bottom portion being predominantly of a color which reflects light having a wavelength which attracts the target insects; the top portion of the apparatus comprising an enclosed chamber except for an entrance opening thereinto positioned over and surrounding the upper end of the bottom portion such that no portion of the entrance opening touches the fins and further such that the at least one channel terminates within the chamber.

BRIEF DESCRIPTION OF THE DRAWINGS

FIG. 1(*a*) shows elevational views of the sections which may be fitted together to form the bottom portion of the trap.

FIG. 1(*b*) is an elevational view of the bottom portion of the trap.

DETAILED DESCRIPTION OF THE INVENTION

Figure 2:
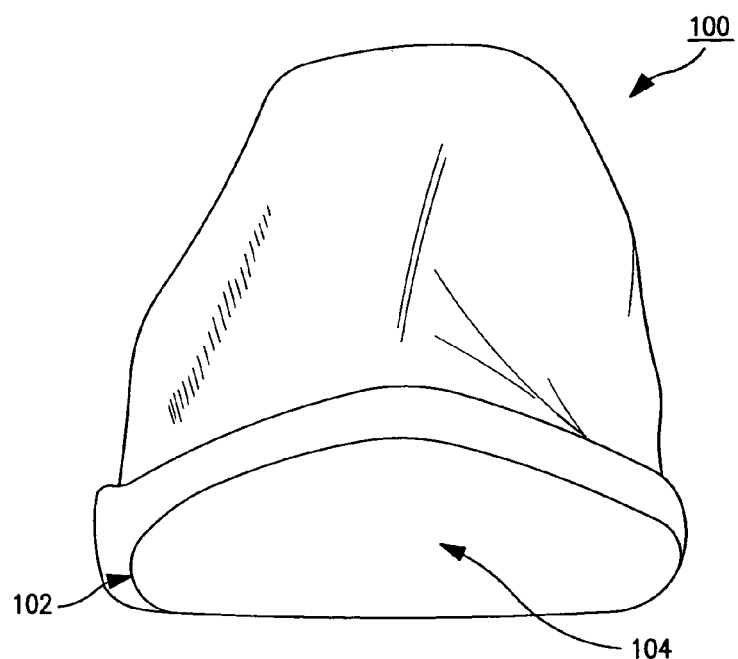
FIG. 2 is an elevational view of the top portion of the trap.

The invention will be described hereinbelow with particular reference to a system for attracting and capturing stinkbug insect species; however, it will be understood by those skilled in the art that the system is equally applicable for the attraction and capture of any flying insect capable of walking or crawling after flight. Thus, the system can be adapted for the capture of assassin bugs and their relatives [families: Pentatomidae, Reduviidae and Nabidae], lady beetles [Coccinellidae], wasps, yellow jackets, hornets, etc., by modifying the color of the trap, the shape of the fins or wings to form channels which accommodate the walking or crawling habits of the target insect species and employing various target insect attractants, baits and pheromones.

The apparatus of the invention may also be used as a dispensing device to inoculate attracted insects with biological control agents such as microbial pesticides, antagonist disease organisms, marker dyes and the like. It is also a very valuable scientific tool providing methodology for research such as biodiversity studies.

Referring to FIGS. 1(*a*) and 1(*b*), the bottom portion 10 of the insect trap of the invention is preferably formed from planar sections 12 and 14 which are provided with saw kerfs 16 and 18, respectively, which extend to the center of the sections 12 and 14 from the bottom and top, respectively, thereof. Sections 12 and 14 are fitted such that the saw kerfs are slotted together forming the unitary bottom portion 10 with the wings or fins 20 extending radially outward from the longitudinal axis 22 of the unit.

Holes 24 are provided at the bottoms of the planar sections 12 and 14 such that when assembled, the bottom portion 10 may be anchored to the ground therethrough with, e.g., stakes 26.

The overall height of the bottom portion 10 of the trap of the invention may be varied according to the species of insect targeted for capture. It is a particular feature of the present invention, when applied to the attraction and capture of stinkbug species, that the bottom portion have an overall height of from about 60 cm to about 120 cm which has been found by the inventor to be the average stinkbug "landing height" when alighting on its targets. This is a critical discovery since it allows the trap to be placed on the ground rather than inconveniently in trees or other support structures.

As will also be apparent to those skilled in the art, any convenient means may be employed to anchor the bottom portion of the trap to the ground. Indeed, the anchoring means may be eliminated without departing from the spirit and scope of the invention.

The wings or fins 20 cooperate with each other to form channels which taper in width from the wider base to the top of the bottom portion.

The bottom portion 10 may be constructed from any suitable material, e.g., masonite, cardboard, plastic (polyvinyl chloride, coraplast, etc.), plywood and the like. The bases of the fins or wings 20 may vary in length from 30 cm to 60 cm, again depending upon the overall height of the bottom portion 10. For correct and efficient operation of the trap, the fins should form an angle (opposite to the longitudinal axis) between 60° and 80°. It has been found that angles less than 60° reduce the efficiency of the trap by permitting the insects to fly off the surface thereof.

FIG. 2 depicts the insect capturing chamber or top portion 100 of the apparatus. The chamber comprises a baglike element with a flared opening 102 designed to fit over the top of the bottom portion in such a manner that the flared opening does not touch the fins or wings thereof. The interior 104 of the element 100 forms the insect trapping chamber. The top portion of the apparatus rests on and is supported by the fins or wings which contact the interior 104 of the element 100; however, no portion of the opening 102 contacts the fins or wings, thereby permitting unimpeded access into the top portion by the insects. An attractant, bait or pheromone for the target insect may be incorporated within the chamber, if desired.

However, the channels of the bottom portion are designed to encourage the natural movement of the walking or crawling insect in an upward direction to the top of the bottom portion 10, at which point they are within the enclosed chamber of the top portion wherein they are entrapped.

The top portion 100 is formed from a material of a color which neither attracts nor repels the target insects. Preferably, it is constituted from a screen-like or transparent or translucent material such that it admits ambient light into the interior thereof so as to present a non-threatening environment to the upward moving target insects in the channels of the bottom portion.

Figure 3:
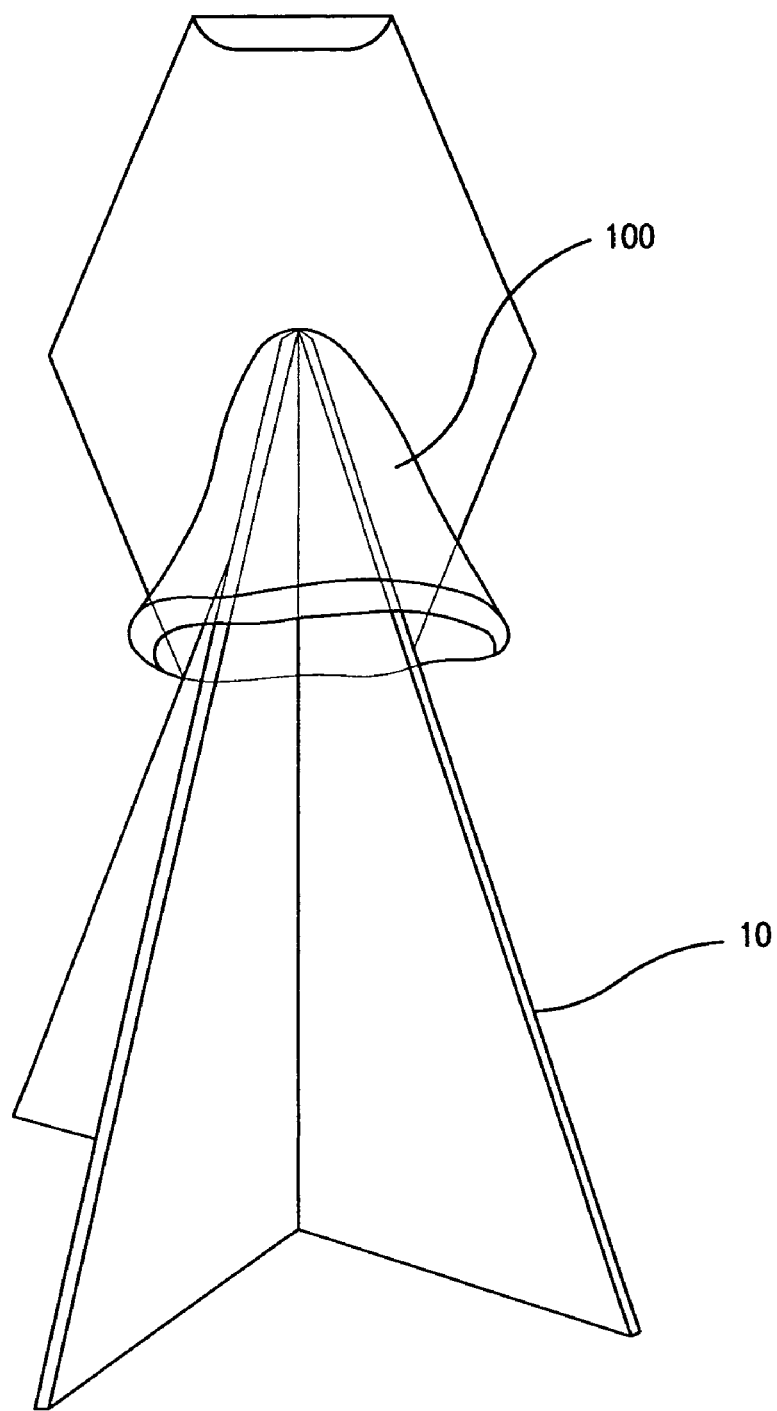
FIG. 3 is a plan view of the trap of the invention.

FIG. 3 shows the trap apparatus fully assembled, i.e., the top portion 100 fitted over the bottom portion 10.

The target insects are attracted to the trap's colored bottom portion. They visually orient by walking or flying to the attracting bottom portion, land thereon, orient vertically on the trap, usually in the channels defined by the wings or fins 20 and climb upward into the top capture chamber without flying away. The target insects behave in this manner when climbing for the following reasons:

a. the color attracts the insects and then arrests them on the trap;

b. the multi-wing design (cones do not function) which channels the insects toward the trap center, trapping them in two of three directions which stimulates climbing behavior;

c. the negative geotaxis response of the insects to the sharp angle of the edges of the trap's base wings which keeps insects walking/climbing vertically and inhibits their flight;

d. the triangular shape in the vertical plane opposite the longitudinal axis, forming an angle of between 60° and 80°, which channels the insects into the top capture chamber;

e. the shape and fit of the capture chamber which connects at the top of the triangular wings maintains entrance holes, but flares away $\geq 2$ cm from the base triangles so that the insects are channeled into and not over the capture chamber; and f. the configuration and materials from which the capture chamber is made that are transparent or translucent, allowing light penetration which does not repel the target insects. The capture chamber is also neutrally colored so as not to attract the insects away from the base.

Upon entering the chamber, the insects remain alive and cannot escape, thus facilitating collection and handling and eliminating the need for petroleum-based sticky adhesive materials that are used in most insect traps.

Reference is made to FIG. 5 which illustrates plans for the stinkbug screen trap top and masonite base of the present invention. The same base may be used for weevils and stinkbugs, whereas different colors and tops are used to trap the respective pest groups. Regular mesh metal window screen is employed which may be cut out with scissors and stapled together as shown (see A–F in FIG. 5). The trap may be opened from the top or, alternatively, by pulling the cone inside out to shake out the contents thereof. When the assembly is folded out in the correct position (see I in FIG. 5), the center will have a hole formed so that the trap may be slipped over a 4–5' high ¼-inch metal rod placed in the ground. The trap may also be constructed from two triangles, one center cut from the bottom, the other center cut from the top, and pieced together to form the trap. If the latter method is employed, the trap will require wire stakes on each of the four corners to hold the same in the ground. When the trap top and base are properly assembled, the bottom edges of the trap do not touch the edge of the masonite base. For additional support, soil may be mounded and tamped around the trap. The screen tops remain in place on the base by means of friction. To attract and trap stinkbugs, it is recommended that the masonite base be primed with a water sealer and then painted bright yellow; for weevils, dark gray or black paint is suggested. Although the height of the trap does not appear critical, tests have confirmed that traps of 4' in height perform best.

In contrast, the prior art Tedders trap base is constructed of eighth-inch tempered masonite. As may be seen at G and H in FIG. 5, four identical triangles are held together by heavy plastic cable ties through holes located at 6", 11" and 16" from the wider bottom and 7", 12" and 17" from the narrower top.

Following is a list of insect species trapped by the apparatus of the present invention:

Pentatomidae:
*Euschistus servus*
*E. tristigmus*
*Oebalus pugnax*
*Acrosternum hilare*
*Nezara viridula*
*Thyanta pallido-virens accerra*
*Banasa* spp.
*Stiretus anchorago*
*Hymennarchys nervosa*
Coreidae:
*Leptoglossus phyllopus*
*L. oppositus*
*Acanthocephala femorata*
*A. terminalis* (Dallas)
*Alydinae* spp.
Miridae:
*Lygus lineolaris*
Curculionidae:
*Pachnaeus opalus* (Olivier), blue-green beetle
*Pantomorus cervinus* (Boheman), fuller rose beetle
*Pachylobius picivorus* (Germar), pitch eating weevil
*Conotrachelus nenuphar* (Herbst), plum curculio
*Hylobius pales* (Herbst), pales weevil
*C. posticatus* Boheman
*C. anaglyticus* Say
Heteroptera:
*Homalodisca coagulata*

Figure 4:
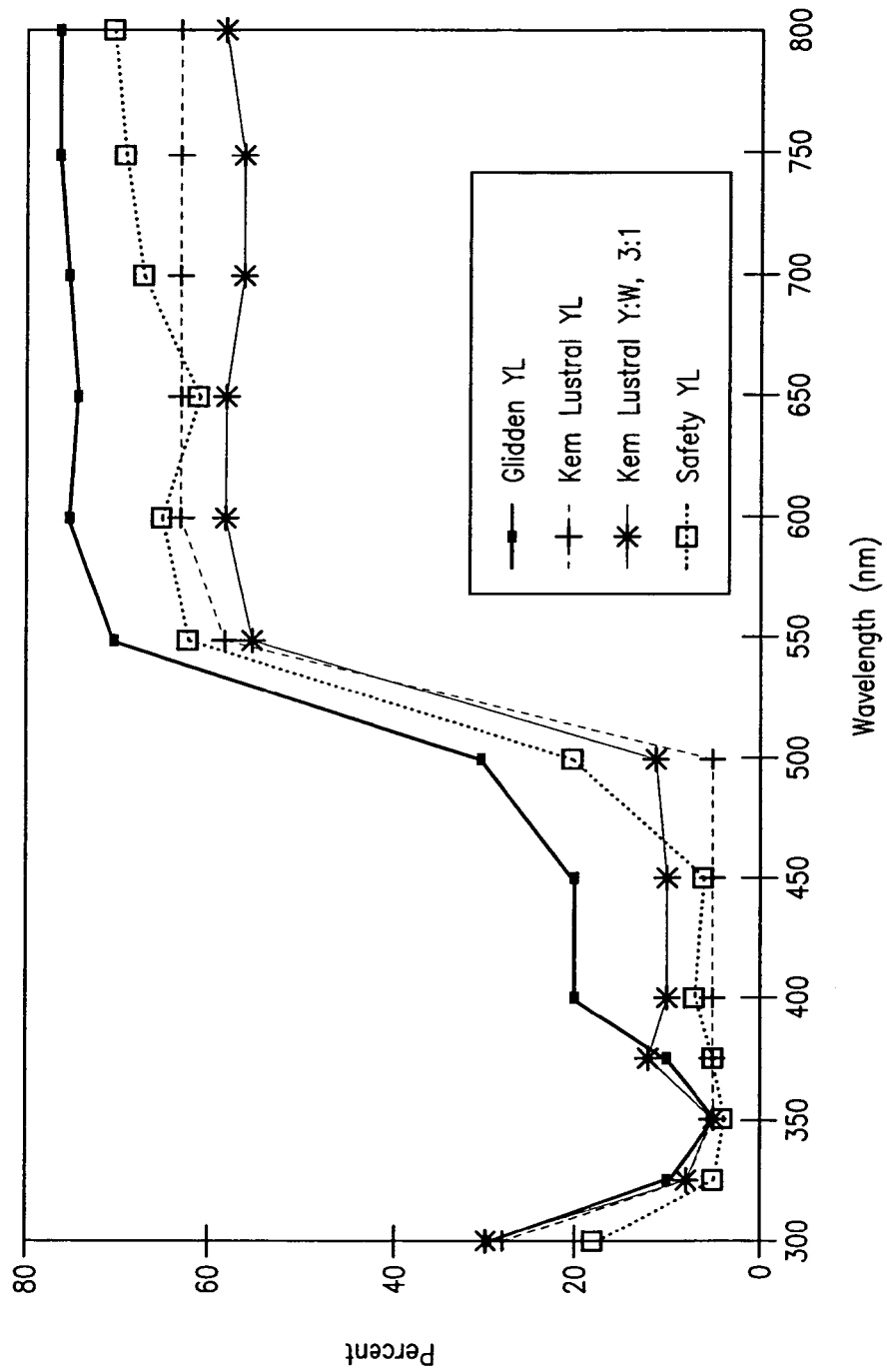
FIG. 4 illustrates the percent of light reflectance from traps painted four differing shades of yellow.
Figure 5A:
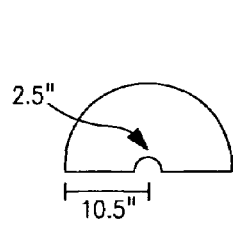
FIG. 5 depicts cut-outs of elements which may be assembled to form the apparatus of the invention.
Figure 5C:
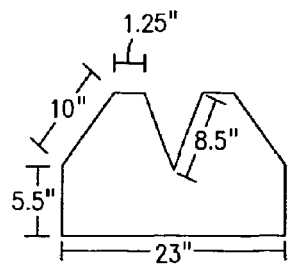
Figure 5E:
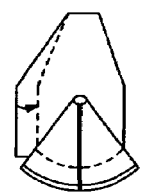
Figure 5B:
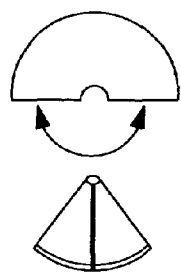
Figure 5D:
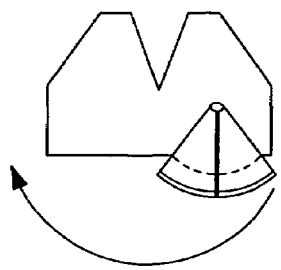
Figure 5F:
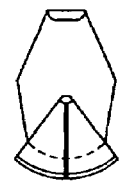
Figure 5G:
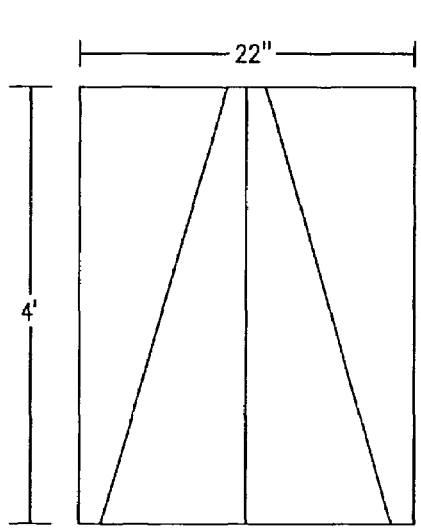
Figure 5H:
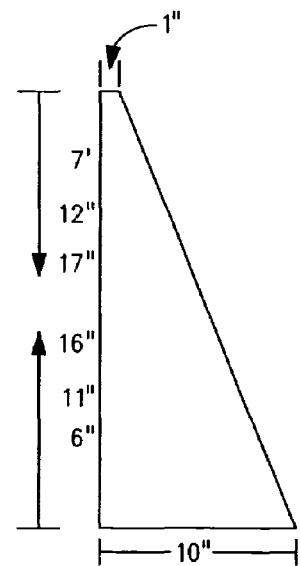
Figure 5I:
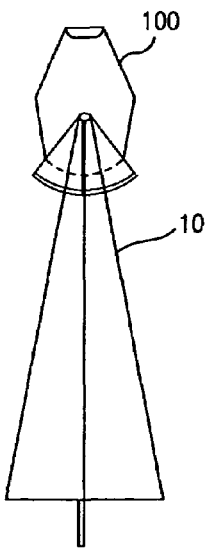

*H. insolita*
*Prosaphia bicincta*, two-lined spittle bug
Reduviidae:
*Zelus exsanguis*
*Sinea spinipes*
*Apiomeris floridensis*
*Arilus cristatus*
Nabidae:
*Nabis* spp.
Coccinellidae:
*Harmonia axyridis*
*Coleomegilla maculata*
*Coccinella septempunctata*
*Cycloneda munda*
*C. sanquinea*
*Olla v-nigrum*
*Chilocorus stigmus*
Cereambycidae:
*Monochamus titilator*
Buprestidae:
*Chrysobothris femorata*, flat-headed apple tree borer
*Chrysoela* sp.
Chrysomelidae:
*Diabrotica undecempunctata*
*Altica foliacae*
*Colaspis* sp.
*Epilachna varivestis*
Vespidae:
*Vespula maculifrons*, eastern yellow jacket
*Vespa crabro*, European hornet
Miscellaneous Species and Families:
*Plycia nearctia*, the lovebug
*Languria mozardi*, clover stem borer
*Enoclerus* sp.
*Temnochila virescens*
Cucujidae
Lycidae
Cantharidae
Lampyridae
Nidulidae
Chrysopidae
Hemerobiidae
Syrphidae To capture stinkbugs, the bottom portion is colored yellow so as to reflect approximately 15% of the incident light in the wavelength range of about 300 to 500 nm, and approximately 55–70% of the incident light in the wavelength range of about 500 to 750 nm, which have been found to attract stinkbugs. See FIG. 4.

The trap described by Tedders (supra) was developed for entrapping pecan weevils. The Tedders trap is dark colored (optimum: black, brown, gray or blue) and functions as a supernumerary mimic of a tree trunk. The target insects (Coleoptera: Curculionidae, "weevils") spend a portion of their life cycle as immature insects in the soil and have evolved a unique adaptive behavior upon emerging from under the host tree (or arriving at the tree from over-wintering in the case of some Curculionids such as plum curculio), i.e., the majority of the adults of both sexes walk to the host tree trunk instead of flying from the ground up into the tree. This fact is critical in the function of the Tedders trap and one of the keys to its success.

Walking to the host tree trunk is a behavioral adaptation to a variable resource (their food, e.g., fruits and nuts) and provides Curculionid weevils the opportunity to increase their probability of successful reproduction as adults by, upon emergence from the ground, returning first to the host plant they successfully developed on as immature insects. These insects respond to the absence of light, i.e., orient to silhouettes, rather than being attracted to the quality of light, i.e., the reflectance of specific wavelengths of light in the 300–800 nm range of ultraviolet to visible light.

The Tedders trap does not attract and efficiently capture the stinkbug complex which are the preferred target species of the present invention for several critical reasons. It also does not capture other similarly behaving species of Curculionids that are plant dwellers, e.g., boll weevil, *Anthonomus grandis* and pepper weevil, *Anthonomus eugenii*) that fly (little or no ground walking behavior) to their host plants and do not respond to tree silhouettes. These green plant-dwelling species, in contrast to soil-dwelling weevil species, respond to a narrow spectrum of light of specific wavelengths, usually green-yellow, i.e., quality, reflected from the host plant, use sophisticated pheromones in their mate selection behavior and have a visual component in their host-seeking behavior similar to the behavior of the stinkbug complex.

The stinkbug complex feeds on pome and stone fruits, grains, pine cones and vegetables that grow on green plants. These stinkbugs do not spend a portion of their life cycle in the ground. They find their host plant using several sensory modalities including response to plant odors and visual stimuli from the plant spectral reflectance pattern, primarily the green and yellow wavelengths. An aggregation pheromone has been identified for this function for trapping *Euschistus* spp. stinkbugs. The pheromone aggregates the sexes for mating purposes. This aggregation behavior also is in contrast to the Curculionids that are captured in the Tedders trap. For most of these Curculionid species, the existence of pheromones have only rarely been suggested by bioassays and few have been identified after extensive research.

For these reasons, the stinkbug trap of the present invention functions in the opposite manner to the Tedders trap and catches other species of pest insects in the families Pentatomidae and Coreidae (stinkbugs and plant bugs) that are not caught by the Tedders trap.

Another innovation of the stinkbug trap and key difference of the apparatus of the present invention in comparison to the Tedders trap relates to the fact that Curculionids apparently are not repelled by dark places and readily enter the Tedders trap top. In contrast, stinkbugs are repelled by dark places (except in fall when they look for dark places under bark to over-winter) as provided by the boll weevil top of the Tedders trap and usually will not enter them as a result. This was unknown prior to the research which led to the present invention and is critical data relative to the patent application. Therefore, it was necessary to invent a new and different top capture chamber for the triangular base that would encourage stinkbugs and other potential target pests to enter and be captured without attracting them away from the base.

The key characteristics of the stinkbug capture chamber of the present invention are:

i. it allows full spectrum light penetration at high intensity; and ii. it fastens to the bottom wings or fins at the trap top via the hole in the internal cone and flares down over the top ($\geq 13$ cm) of the trap's triangular wings to channel the target insects into the top, but the capture chamber's bottom or flared edges do not touch the wings (space between $\geq 2$ cm) at the edges.

I claim:

1. An apparatus for capturing target insect species comprising stinkbugs comprising:
   a bottom portion for attracting the target insect species and for directing said target insect species toward and into a top portion for the capture thereof;
   said bottom portion comprising at least a first and a second fin, said first fin being disposed in a first substantially vertical plane and said second fin being disposed in a second substantially vertical plane, said first and second fins extending radially outwardly from a common longitudinal axis defined by a line of intersection of said first and second substantially vertical planes;
   a surface of said first fin and a surface of said second fin defining opposing channel surfaces of an outwardly facing channel, said channel surfaces having portions which are directly exposed to an environment in which said target species is present, whereby said directly exposed portions may be seen by members of said target species from positions beyond a perimeter of said apparatus;
   each of said first and second fins being wider at a base portion thereof and narrower at a top portion thereof, whereby said channel defined by said surfaces of said first and second fins narrows from said wider base portions to said narrower top portions; said bottom portion being predominantly of a color which reflects light having a wavelength which attracts the target insect species;
   said top portion of said apparatus comprising a receptacle, said receptacle being open only at an entrance opening, and wherein said entrance opening is positioned at and substantially surrounds, an upper part of said bottom portion, whereby said channel formed by said first and said second fins terminates said receptacle;
   said top portion of said apparatus comprising a material of construction which admits ambient exterior light into the interior of said receptacle and onto said channel surface.

2. The apparatus of claim 1 wherein said planar fins are triangular in shape.

3. The apparatus of claim 2 where in the angles of said fins opposite the longitudinal axis measure between about 600 and 80°.

4. The apparatus of claim 2 wherein said planar fins are essentially right triangles joined at the longest side which is not the hypotenuse such that the shortest sides form the base of the bottom portion of the apparatus and the apexes opposite said shortest sides form the upper end of said bottom portion.

5. The apparatus of claim 2 having four triangular fins.

6. The apparatus of claim 1 wherein said predominant color is one which reflects about 15% of the incident light in a wavelength of from about 300 nm to about 500 nm and about 55%–70% of the incident light in a wavelength of from about 500 nm to about 750 nm.

7. The apparatus of claim 1 wherein said bottom portion has a height of from about 30 to about 120 cm.

8. The apparatus of claim 1 wherein the base of said botton portion contains means for anchoring said apparatus to the ground.

9. The apparatus of claim 1 wherein interior and exterior surfaces of said chamber comprising said top portion are predominantly of a color which reflects light having a wavelength which neither attracts nor repels the target insect species.

10. The apparatus of claim 1 wherein said material of construction of said top portion is screening which is impervious to the passage therethrough of said stink bugs.

* * * * *

UNITED STATES PATENT AND TRADEMARK OFFICE
CERTIFICATE OF CORRECTION

PATENT NO. : 7,150,125 B1 Page 1 of 1
APPLICATION NO. : 08/654600
DATED : December 19, 2006
INVENTOR(S) : Russell F. Mizell, III It is certified that error appears in the above-identified patent and that said Letters Patent is hereby corrected as shown below:

Col. 8 line 2 please correct the spelling

Change "botton" to --bottom--

Signed and Sealed this

First Day of May, 2007

JON W. DUDAS
*Director of the United States Patent and Trademark Office*